…

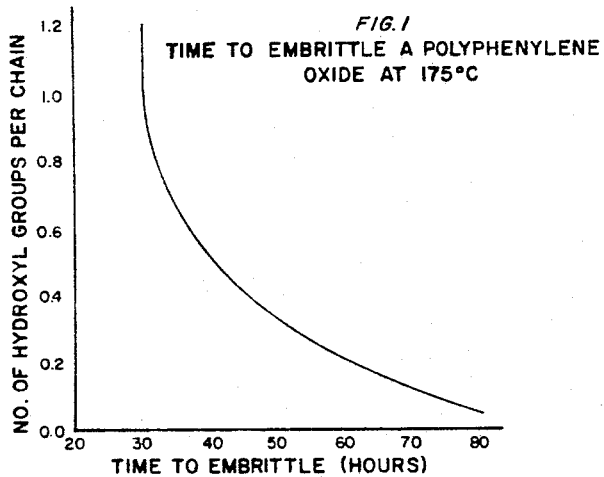
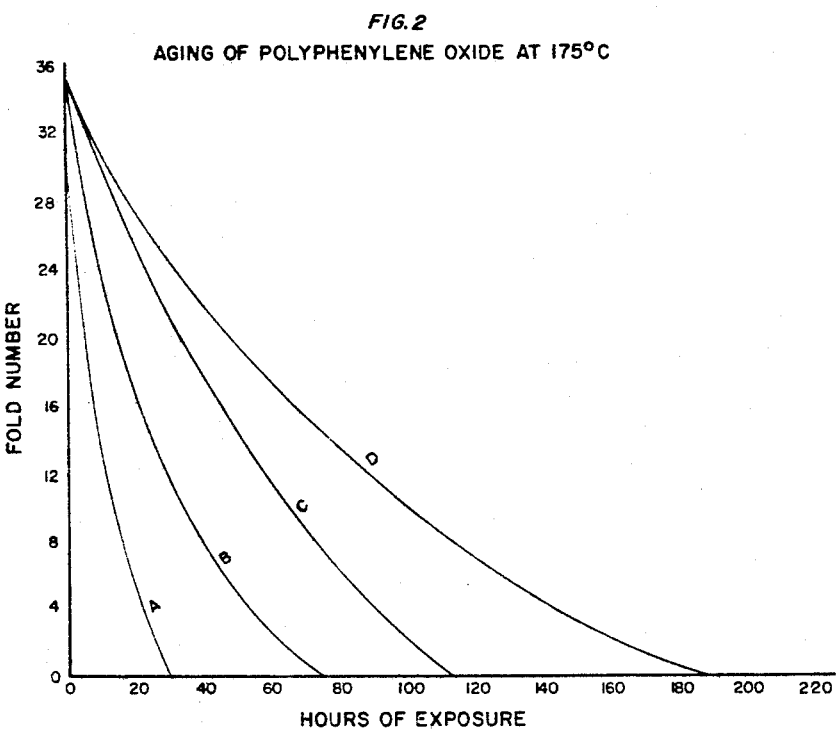

United States Patent Office 3,392,146
Patented July 9, 1968

3,392,146
KETENE STABILIZERS FOR POLY-
PHENYLENE OXIDES
Robert P. Anderson, Dalton, and Klaus E. Holoch and
Willard B. Howe, Pittsfield, Mass., assignors to General
Electric Company, a corporation of New York
Filed Aug. 8, 1966, Ser. No. 570,947
7 Claims. (Cl. 260—47)

ABSTRACT OF THE DISCLOSURE

Stabilization of polyphenylene ethers with ketene and substituted ketenes.

---

This invention relates to polyphenylene oxide plastics, and more particularly, to the stabilization of these plastics with ketenes.

The polyphenylene oxides are disclosed and claimed in U.S. Patents Nos. 3,306,874 and 3,306,875, the contents of which are incorporated herein by reference. They are characterized by a unique combination of chemical, mechanical and electrical properties over a broad range of temperatures and are suitable for many commercial applications.

It is known that the polphenylene oxide resins are somewhat thermally unstable in the presence of oxygen containing atmospheres. By thermally unstable, it is meant that the resin has a tendency to become discolored and embrittled and otherwise undesirable for many commercial uses upon exposure to elevated temperatures in oxygen containing atmospheres. The cause of the degradation of the polymer is not fully understood, however, it appears as if the presence of reactive hydroxyl groups disposed primarily on the terminal portions of the polymer contribute to the degradation.

It has now been unexpectedly found that the ketenes are reactive with the hydroxyl groups contained in the polymer and the addition of a ketene to a polyphenylene oxide prevents, to a large extent, degradation at elevated temperatures. Exposure of a polyphenylene oxide stabilized with a ketene to an oxygen containing atmosphere at temperatures in excess of 150° C. for a period of time in excess of 250 hours has only a minor effect on the polymer.

Accordingly, an object of this invention is to provide a polyphenylene oxide resinous composition having superior ability to withstand discoloration and embrittlement upon exposure to an oxygen containing atmosphere at elevated temperatures for prolonged periods of time.

Another object of this invention is to provide a stable polymeric composition which is the reaction product of a polyphenylene oxide and a ketene.

Other objects and advantages of this invention will be in part apparent and in part pointed out in the description which follows.

Briefly stated, the objects of this invention are achieved by reacting a ketene with the hydroxyl groups contained in the polymer. Though the reason is not fully understood, it has been established that the presence of the hydroxyl groups is one of the major causes of the polymer's degradation. This is graphically illustrated in FIGURE I of the drawings which is a plot of hydroxyl content per polymer chain versus the time to embrittle i.e., the time in which the polymer will become too brittle to withstand a bend of 180° at 175° C. in an air atmosphere. It is evident that the time to embrittle increases as the hydroxyl content decreases.

The expression "polyphenylene oxide resins" as used herein is meant to include within its scope those polymers disclosed and claimed in the above-noted patents, as well as copolymers and polymer blends wherein a polyphenylene oxide is present in substantial quantity.

The expression "ketene" is meant to include those materials corresponding to the following general formula:

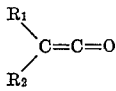

wherein $R_1$ and $R_2$ are members selected from the group consisting of hydrogen and lower alkyl i.e., 1–6 carbon atoms.

The ketenes are a reactive group of organic compounds ranging from a colorless gas for low molecular weight ketenes i.e., unsubstituted ketenes to a dark yellow liquid with a pungent odor for the higher molecular weight ketenes. The form of the material influences the process for adding it to the polyphenylene oxide resins. If a gaseous ketene is used, it is bubbled or passed through a solution of the polyphenylene oxide to effect reaction of the ketene with the hydroxyl groups. Normally, the lower molecular weight ketenes are so reactive that a catalyst is not necessary to induce the reaction. However, it has been found that the addition of a basic catalyst, preferably one that is soluble in the polymer solution, increases the rate of reaction. Typical catalysts that may be used include, but are not limited to pyridine, tributylamine, triethylamine, piperazine, morpholine, etc. After the gaseous ketene has been passed through the polymer solution, the polymer may be recovered by precipitating with a precipitant such as methanol.

When the ketene is in liquid form, it may be added to the polymer in the form of a solution. Preferably, a solution of the polymer is prepared and a second solution of the ketene is prepared. The two solutions are mixed together for a period of time sufficient to allow complete reaction of the ketene with the hydroxyl groups of the polymer. The higher molecular weight liquid ketenes are less reactive than their gaseous low molecular weight homologues and a catalyst is desirable. The catalysts noted above are suitable for this reaction. The polymer may be recovered by adding a precipitant for the polymer such as methanol.

The reaction of the ketene with the polyphenylene oxide is preferably carried out in an inert, oxygen-free atmosphere, as it has been found that oxygen has a tendency to cause decomposition of the ketenes with liberation of carbon dioxide.

Theoretically, one mole of ketene is required for every hydroxyl group contained in the polyphenylene oxide chain. The polyphenylene oxides, in their purest form, have one terminal hydroxyl group per polymer chain. However, it is frequently necessary to use a large excess of the theoretical amount of ketene. The quantity of ketene employed may vary within rather broad limits and generally, may vary between 0.01 to 20% by weight, calculated on the polymer and preferably, may be used in an amount varying between 0.1 and 8% by weight, calculated on the polymer.

The stabilized compositions of this invention are useful for all purposes for which the polyphenylene oxide resins have hitherto been used, for example, for formation of films, fibers, molded articles and the like, by conventional methods.

The following examples serve to illustrate the invention but they are not intended to limited it thereto, the parts being by weight unless indicated otherwise.

Example 1

This example illustrates the aging properties of a polyphenylene oxide free of a stabilizer when subjected to elevated temperatures in an oxygen containing atmosphere for prolonged periods of time.

Samples were prepared for testing by molding films from powders of a poly-(2,6-dimethyl-1,4-phenylene)-oxide having a hydroxyl content of about 0.050%. The resin powder was placed between sheets of aluminum foil using 10 mil shims. The molding temperature was maintained at approximately 550° F. for two minutes. The so-formed films were allowed to cool and then cut into strips having a width of about one centimeter. All film so-formed had thicknesses ranging between nine and twelve mils.

To determine the aging properties of the polymer, the film was suspended in an oven maintained at an elevated temperature for prolonged periods of time. The oven had a circulating air atmosphere. For purposes of experimentation, temperatures of both 150° C. and 175° C. were used.

The effect of aging on both color and embrittlement was noted. The effect on color was determined by a visual inspection of the sample after exposure. The effect on embrittlement was determined by a measure of the fold number after exposure. The fold number is determined by subjecting the film strip to a series of folding cycles which consists in folding the film through 180° and pressing the two halves firmly together without creasing. Thereafter, the film is folded in the opposite direction through 360° to complete one and one-half cycles and then continuously re-folded through 360° until a crease forms and three-quarters of the width has been ruptured. The number of folding cycles required for this rupture is defined as the fold number. A total of three films are tested to obtain an average fold number.

The film samples were subjected to temperatures of 150° C. and 175° C. in an air atmosphere for prolonged periods of time. The samples were examined periodically throughout the test to determine visually whether the sample was discolored and whether or not there was a change in the fold number. The following results were obtained:

TABLE 1

| Time (hours) | Color | | Fold Number | |
| --- | --- | --- | --- | --- |
| | 150° C. | 175° C. | 150° C. | 175° C. |
| 0 | Yellow | Yellow | 30 | 30 |
| 24 | do | Dark yellow | 14 | 2 |
| 48 | Dark yellow | Brown | 11 | 0 |
| 74 | do | do | 5 | 0 |
| 120 | do | Dark brown | 2 | |
| 168 | Brown | do | 0 | |
| 192 | Dark brown | do | 0 | |
| 240 | do | Black | 0 | |
| 360 | do | | | |
| 480 | do | | | |

From the above table, it can be seen that the color becomes progressively darker with aging both at 150° C. and 175° C., however at the higher temperature, the discoloration of the sample is greatly accelerated. In addition, the fold number decreases very rapidly upon exposure to the elevated temperatures.

Example 2

The polyphenylene oxide of Example 1 was dissolved in toluene to form a 10% by weight polymer solution. Seven milliliters of triethylamine per 100 grams of polymer were added to the solution. The triethylamine functions as a catalyst. A second solution was prepared containing 20% butylethylketene dissolved in toluene. A quantity of the second solution was added to the first solution in an amount equivalent to seven grams of butylethylketene per 100 grams of the polymer. The resulting solution was stirred for two hours and methanol was added in an amount capable of precipitating the polymer. The precipitated polymer was collected, dried, and the hydroxyl content was found to be 0.009%. Films were formed in the manner described in Example 1. The films so produced were subjected to aging at temperatures of 150° C. and 175° C. in an air circulating atmosphere for prolonged periods of time. Color change and embrittlement were determined following the procedure set forth in Example 1. The following results were obtained:

TABLE II

| Time (hours) | Color | | Fold Number | |
| --- | --- | --- | --- | --- |
| | 150° C. | 175° C. | 150° C. | 175° C. |
| 0 | Light yellow | Light yellow | 35 | 35 |
| 10 | | | | 23 |
| 24 | | Light yellow | 25 | 17 |
| 48 | | | 20 | 6 |
| 74 | | Yellow | 15 | 0 |
| 120 | Light yellow | do | 8 | |
| 168 | Yellow | Dark yellow | | |
| 360 | do | | | |
| 480 | do | | | |

The addition of butylethylketene to the polyphenylene oxide substantially retarded the rate at which the polymer aged as evidenced by the above table. For example, aging at 150° C. for a period of 480 hours resulted in a dark brown control sample, while the stabilized polymer was only yellowed. The control polymer of Example 1 was darker in color and had a lower fold number than the stabilized sample even prior to aging because some aging took place upon molding of the sample. The fold number decrease was substantially retarded in the stabilized sample at a temperature of 175° C.

Example 3

A solution was prepared consisting of ten parts of the polymer of Example 1, ten parts triethylamine and 90 parts benzene. Gaseous ketene was passed through this solution for a period of two hours. The quantity of ketene actually added was equivalent to seven grams per 100 grams of polymer. Methanol was added to precipitate the polymer which was collected and dried. The polymer's hydroxyl content was found to be 0.01%. Films from the polymer were prepared in the manner described in Example 1. The polymer was aged at 150° C. and 175° C. in air for prolonged periods of time and color and fold number were determined. The following results were obtained:

TABLE III

| Time | Color | | Fold Number | |
| --- | --- | --- | --- | --- |
| | 150° C. | 175° C. | 150° C. | 175° C. |
| 0 | Light yellow | Light yellow | 35 | 35 |
| 12 | | | 32 | 23 |
| 24 | Light yellow | Light yellow | 27 | 13 |
| 48 | do | Yellow | 20 | 0 |
| 74 | | | 13 | 0 |
| 120 | Yellow | Dark yellow | 6 | |
| 168 | Dark yellow | Brown | 0 | |

As in the previous examples, the reaction of the polymer with the ketene retarded the rate at which the polymer degraded.

Example 4

A sample was prepared from a poly-(2-methyl-6-phenyl-1,4-phenylene)-oxide with a butylethylketene stabilizer. The sample was prepared in accordance with the procedure set forth in Example 1. Approximately ten grams of butylethylketene were added per 100 grams of polymer. A triethylamine catalyst was used to increase the rate of reaction of the hydroxyl groups with the ketene. The hydroxyl content of the polymer was initially 0.015% and after addition of the ketene, it was found to be 0.002%. Films were prepared from the polymer and aged at 175° C. in an air atmosphere for 120 hours. A control sample free of ketene was prepared and aged in the same manner. The control sample was found to be brown after aging. The sample containing the ketene was a very pale yellow. All samples were quite brittle due to the nature of the polymer, and the control sample had a fold number of zero before aging. The sample reacted with the ketene had a fold number of about one prior to aging.

Example 5

The procedure of Example 4 was repeated, but a poly-(2,6-diphenyl-1,4-phenylene)-oxide was used. The hydroxyl content of the control sample was 0.026% and the sample containing the butylethylketene addition had a hydroxyl content of 0.003% indicating substantial reaction between the ketene and the hydroxyl groups. The sample was too brittle to measure fold numbers.

The hydroxyl content of the polyphenylene oxides is only one cause of its instability. The use of a ketene as a stabilizer for the polyphenylene oxides is only to prevent degradation of the polymer caused by the hydroxyl groups. Thus, it should be understood that other stabilizers can be used in combination with the ketenes. For example, in co-pending U.S. patent application Ser. No. 528,784, filed Feb. 21, 1966, and incorporated herein by reference, there is disclosed a stabilizer system wherein the stabilizer is a member selected from the group consisting of a 2-mercaptobenzimidazole benzoate, a 2-mercaptobenzothiazole and a 2-mercaptobenzoxazole benzoate, used alone or in combination with an organo phosphorous compound. FIGURE II shows a plurality of curves representing a comparison of the aging properties of a control sample of a poly-(2,6-dimethyl-1,4-phenylene)-oxide with stabilized poly-(2,6-dimethyl-1,4-phenylene)-oxide compositions. Curve A represents the control sample. Curve B shows the aging properties of the same polymer stabilized with a butylethylketene. Curve C represents the aging properties of the control sample loaded with a stabilizer consisting of 1% of a 2-mercaptobenzimidazole dibenzoate and 0.5% of phenylneopentyl phosphite. Curve D graphically illustrates the aging properties of the control polymer stabilized with the butylethylketene of curve B and the stabilizer of curve C. It can be seen that the use of butylethylketene alone or the stabilizer of the above-noted co-pending application gives improved results, however, these results are additive when used in combination in a base polymer.

It should, of course, be apparent to those skilled in the art that changes may be made in the particular embodiments of the invention described which are within the full intended scope of the invention as defined by the appended claims.

What we claim as new and desire to secure by Letters Patent of the United States is:

1. A polymeric composition resistant to oxidative degradation at elevated temperatures comprising the reaction product of a polyphenylene oxide and a ketene having the general formula:

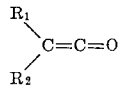

wherein $R_1$ and $R_2$ are members selected from the group consisting of hydrogen and a lower alkyl.

2. The polymeric composition of claim 1 wherein $R_1$ and $R_2$ are hydrogen.
3. The polymeric composition of claim 1 wherein $R_1$ is ethyl and $R_2$ is butyl.
4. The polymeric composition of claim 1 wherein the polyphenylene oxide is poly-(2,6-dimethyl-1,4 - phenylene)-oxide and the ketene is butylethylketene.
5. The polymeric composition of claim 1 wherein the polyphenylene oxide is poly-(2,6-dimethyl-1,4 - phenylene)-oxide and the ketene is unsubstituted ketene.
6. A process for rendering a polyphenylene oxide resistant to oxidative degradation at elevated temperatures which comprises reacting a solution of the polyphenylene oxide with a ketene having the formula

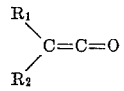

wherein $R_1$ and $R_2$ are members selected from the group consisting of hydrogen and a lower alkyl, and recovering the stabilized polyphenylene oxide from solution.

7. The process of claim 6 where the reaction is performed in the presence of a catalyst selected from the group consisting of pyridine, tributylamine, triethylamine, piperazine, and morpholine.

References Cited

FOREIGN PATENTS 913,480  12/1962  Great Britain.

DONALD E. CZAJA *Primary Examiner.*

JAMES A. SEIDLECK, *Examiner.*

M. J. WELSH, *Assistant Examiner.*